United States Patent [19]

Volk

[11] 4,320,678
[45] Mar. 23, 1982

[54] PORTABLE POWER TOOL ACCESSORY TABLE

[76] Inventor: Michael J. Volk, 216 McKeon Rd., Severna Park, Md. 21146

[21] Appl. No.: 128,554

[22] Filed: Mar. 10, 1980

[51] Int. Cl.³ .............................................. B27B 11/04
[52] U.S. Cl. ...................................... 83/574; 83/522; 83/581; 83/477.2; 83/762; 269/87.2; 30/392
[58] Field of Search ................. 83/574, 522, 581, 455, 83/488, 477.2, 762; 269/87.2; 30/392

[56] References Cited

U.S. PATENT DOCUMENTS

| | | | |
|---|---|---|---|
| 2,656,860 | 10/1953 | Thayer | 83/522 |
| 2,914,099 | 11/1959 | Kaufmann | 83/821 |
| 2,941,554 | 6/1960 | Long | 83/574 |
| 3,983,776 | 10/1976 | Flanders | 83/522 |
| 4,050,340 | 9/1977 | Flanders | 83/522 |
| 4,096,777 | 6/1978 | Adams | 83/762 |

*Primary Examiner*—Donald R. Schran
*Attorney, Agent, or Firm*—Brady, O'Boyle & Gates

[57] ABSTRACT

A portable saw table having an elevated, adjustable track for accommodating various cutting tools such as sabre saws, circular saws and routers, a guide mounted beneath the conventional saw table slot for guiding a cantilevered type blade, such as a sabre saw, during the reciprocatory movement thereof, an adjustable guide member connected to the arm of a protractor mounted on the table, and a pressure block adjustably mounted on the table for biasing the workpiece against the protractor guide member during the cutting operation.

6 Claims, 18 Drawing Figures

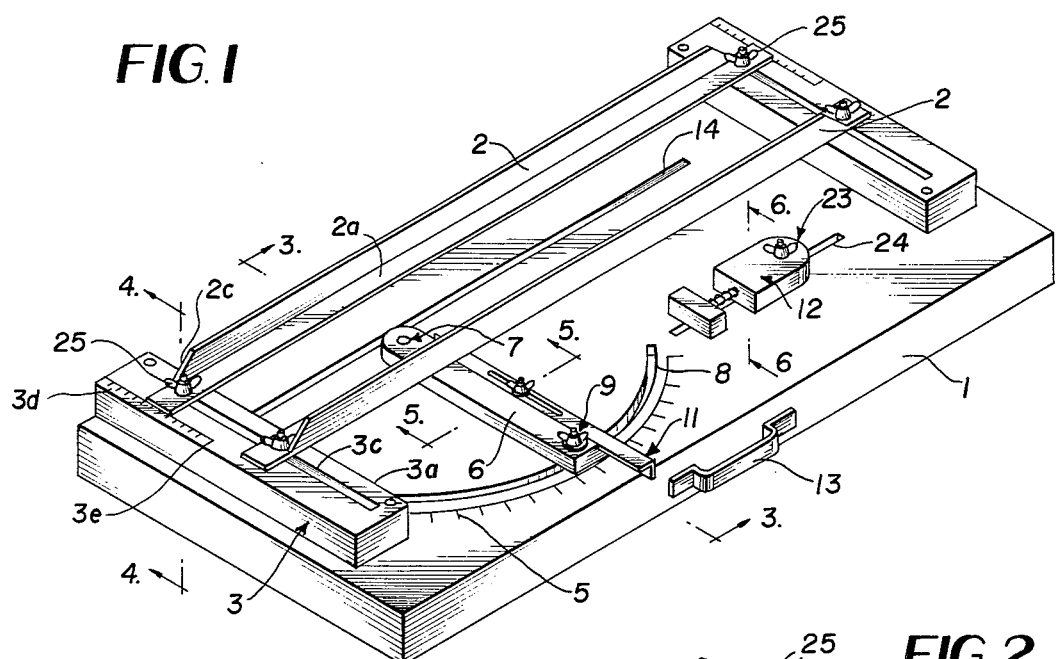
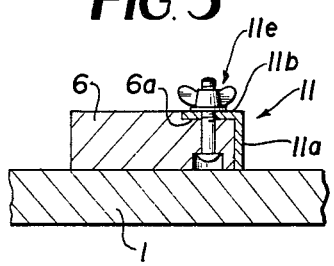
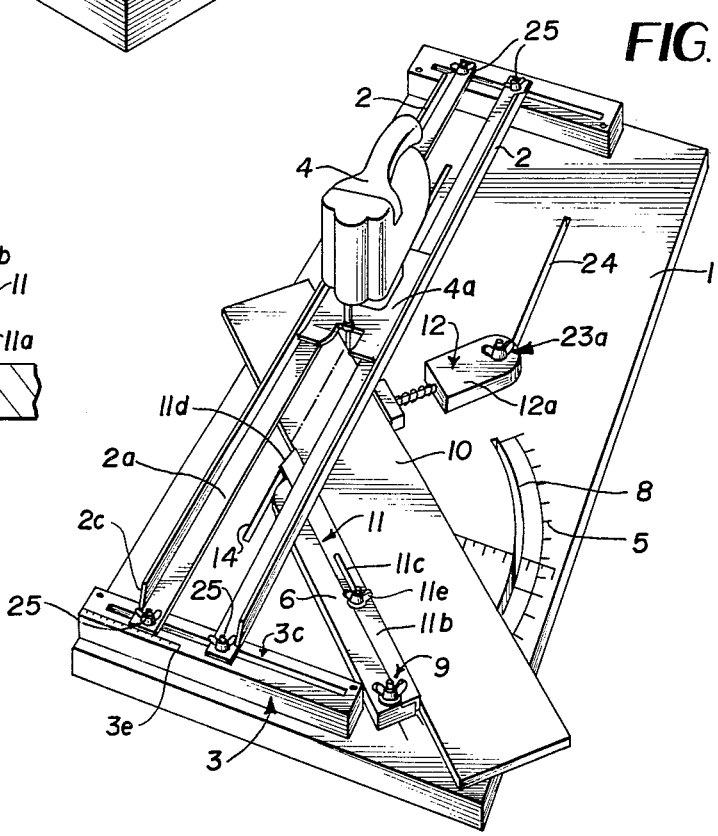
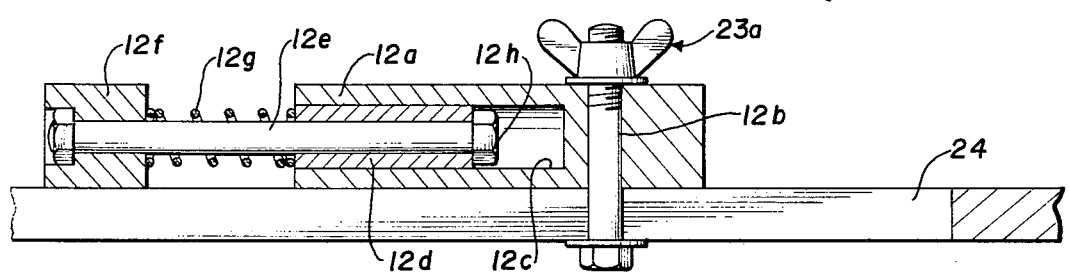

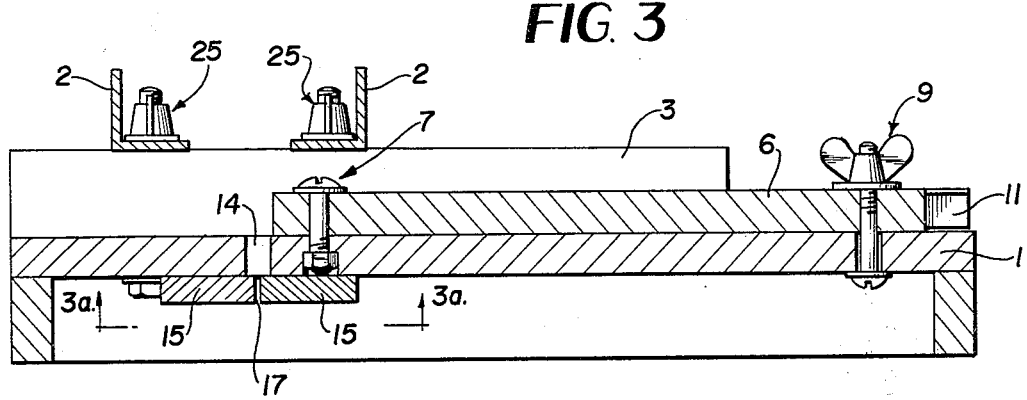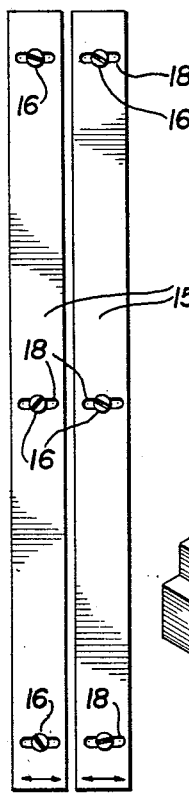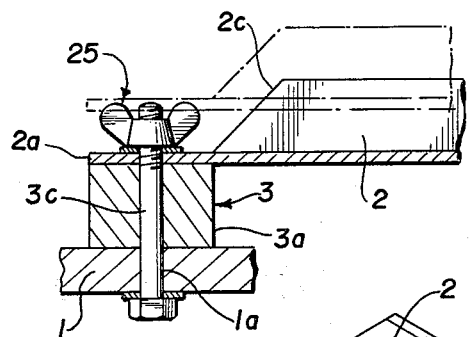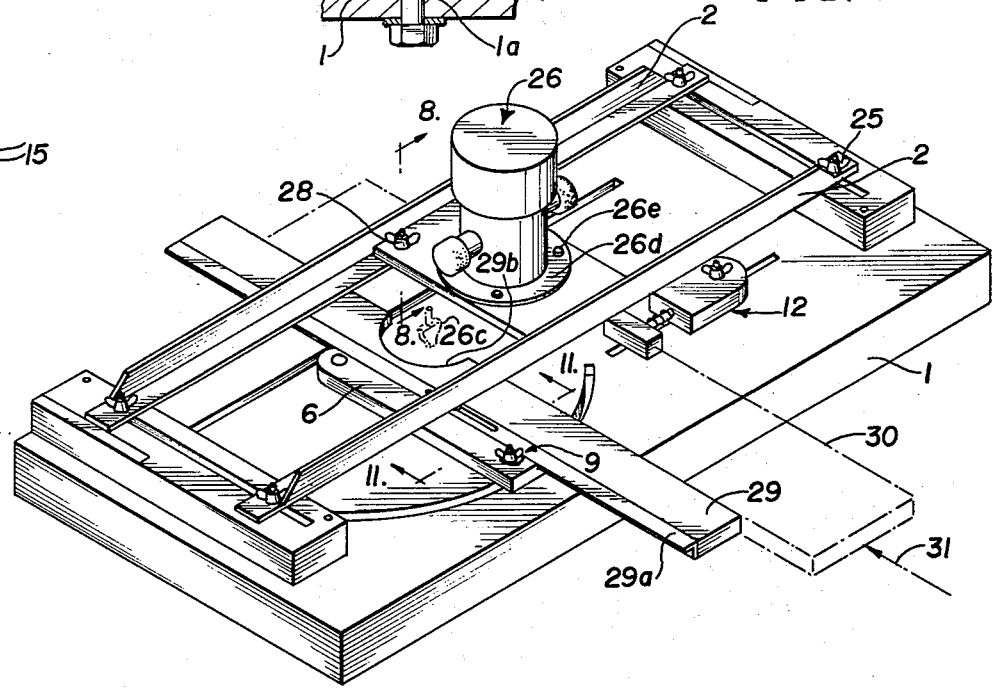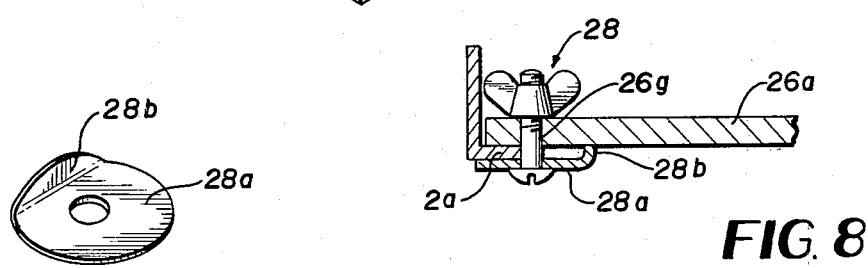

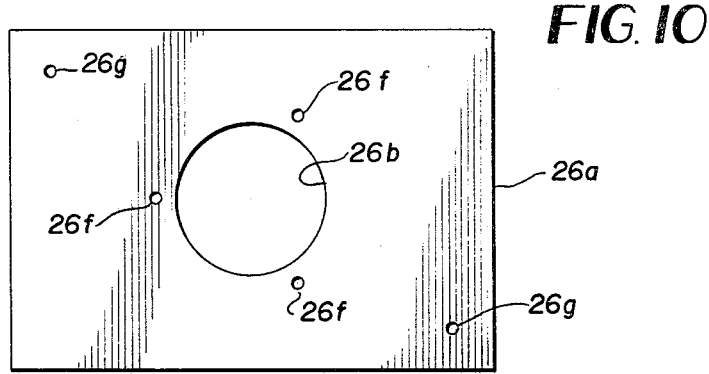
FIG. 10
FIG. 14
FIG. 11
FIG. 12
FIG. 13
FIG. 15  FIG. 16
  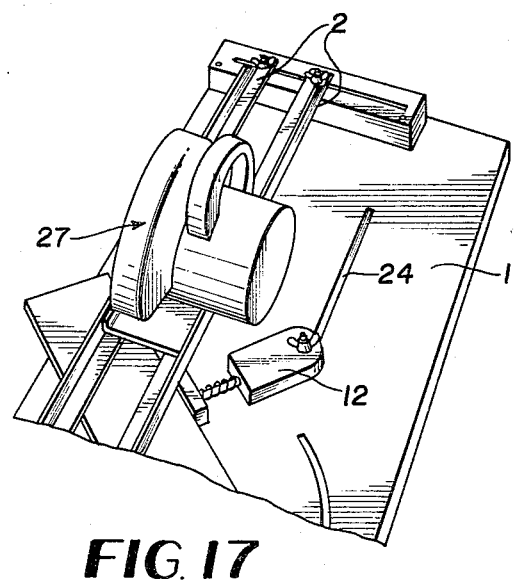
FIG. 17

PORTABLE POWER TOOL ACCESSORY TABLE

BACKGROUND OF THE INVENTION

Heretofore, various portable saw tables have been proposed which included adjustable tracks for accommodating various types of saws and a protractor to facilitate cutting the workpiece at desired angles; one such table is disclosed in U.S. Pat. No. 3,485,275 to Boudreau dated Dec. 23, 1969. While these tables have been satisfactory for their intended purpose, it has been found that when cutting a workpiece with a sabre saw conventional saw tables have not been satisfactory in that during the normal operation of a sabre saw, the blade tends to twist or turn while cutting a workpiece. The conventional saw table slot, having a width much greater than the thickness of the sabre saw blade, provides no guiding of the blade during the reciprocatory movement thereof; consequently, the blade tends to twist while cutting the workpiece. To overcome this disadvantage, the portable saw table of the present invention has been devised wherein guide means are positioned under the bottom surface of the saw table and in alignment with the saw table slot. In one embodiment, the guide means includes a pair of spaced, parallel, longitudinally extending members, adjustably connected to the bottom surface of the saw table, the space between the longitudinally extending members forming a slot having a width less than the saw table slot but slightly greater than the thickness of the sabre saw blade. By this construction and arrangement, the saw blade extends through the saw table slot and guide slot and is guided during its reciprocatory movement by the guide slot whereby the twisting or turning of the blade while cutting a workpiece is prevented.

In another embodiment, the longitudinally extending members comprise tracks upon which an apertured plate is slidably mounted, the end portion of the sabre saw blade extending through the apertured plate.

Other features of the portable saw table of the present invention include scaled support blocks for adjustably mounting the cutting tool tracks on the table to reduce the set-up time for accommodating the table and associated tracks for a particular cutting tool, such as, a circular saw, router or sabre saw. An adjustable guide member is connected to the arm of a protractor on the table for supporting a workpiece during the cutting thereof, and a pressure block is adjustably mounted on the table for biasing the workpiece against the protractor guide member.

BRIEF DESCRIPTION OF THE DRAWINGS

FIG. 1 is a perspective view of the portable saw table of the present invention;

FIG. 2 is a perspective view of the portable saw table of the present invention having a workpiece mounted thereon and being cut by a sabre saw;

FIG. 3 is a view taken along line 3—3 of FIG. 1;

FIG. 3a is a fragmentary view taken along line 3a—3a of FIG. 3 showing one embodiment of the sabre saw guide means;

FIG. 4 is a view taken along line 4—4 of FIG. 1;

FIG. 5 is a view taken along line 5—5 of FIG. 1;

FIG. 6 is a view taken along line 6—6 of FIG. 1;

FIG. 7 is a perspective view of the portable saw table of the present invention set up to accommodate a router;

FIG. 8 is a view taken along line 8—8 of FIG. 7;

FIG. 9 is a perspective view of the washer, shown in FIG. 8, for slidably supporting the router base on the saw table track;

FIG. 10 is a top plan view of the router base employed in the assembly of FIG. 7;

FIG. 11 is a view taken along line 11—11 of FIG. 7;

FIG. 12 is a sectional, fragmentary, side elevational view of another embodiment of the sabre saw guide means;

FIG. 13 is a view taken along line 13—13 of FIG. 12;

FIG. 14 is a plan view of still another embodiment of the sabre saw guide means;

FIGS. 15 and 16 are side elevational views of sabre saw blades adapted to be guided by the guide means shown in FIGS. 13 and 14, respectively; and FIG. 17 is a fragmentary perspective view of the saw table of the present invention, set up to accommodate a circular saw.

DESCRIPTION OF THE PREFERRED EMBODIMENT

Referring to the drawings and more particularly to FIGS. 1 and 2 thereof, the portable saw table of the present invention comprises a table 1 having longitudinally extending angle irons 2 mounted at opposite ends on scaled support blocks 3 secured to the table, whereby the angle irons 2 form an elevated, laterally adjustable track assembly for accommodating a selected cutting tool, such as a sabre saw 4. The table also includes a protractor 5 having a work support arm 6 pivotally connected to the table as at 7. An arcuate slot 8 is provided in the table adjacent the protractor 5 for receiving a bolt and wing nut assembly 9 whereby the workpiece support arm may be set at the particular angle to which the workpiece 10 is to be cut.

An adjustable guide member 11 is connected to the arm 6 for supporting the workpiece 10 during the cutting thereof, and a pressure block assembly 12 is adjustably mounted on the table 1 for biasing the workpiece against the guide member 11, to be described more fully hereinafter.

To complete the general description of the saw table, a handle 13 is provided on an edge thereof to facilitate carrying the table, and a longitudinally extending slot 14 is provided in the table for receiving the blade of the cutting tool during the cutting operation.

One of the main features of the present invention is the use of a guide to prevent the twisting or turning of a sabre saw blade during the cutting operation. An embodiment of the guide is shown in FIGS. 3 and 3a wherein a pair of spaced, parallel, longitudinally extending members 15 are secured to the bottom surface of the table by screws 16, the space between the members 15 forming a slot 17 through which the sabre blade is adapted to extend. The screws 16 extend through slots 18 provided in members 15 whereby the members 15 may be adjusted laterally relative to each other to thereby dimension the guide slot 17 so that it is narrower than the table saw slot 14 but only slightly greater than the thickness of a sabre saw blade. By this construction and arrangement, the reciprocatory movement of the sabre saw blade will be guided by the sides of the members 15, forming the slot 17, to thereby prevent the twisting or turning of the saw blade while cutting a workpiece.

Another embodiment of the saw blade guide is shown in FIGS. 12, 13 and 14 wherein a pair of spaced, parallel, longitudinally extending flanged members 19 are secured to the bottom surface of the table, the flanged members 19 forming a track for receiving an apertured plate 20 slidably mounted thereon. While the apertured plate 20 is adapted to guide the bifurcated end 21 of the sabre saw blade shown in FIG. 15, the apertured plate 22 shown in FIG. 14 would be employed for guiding the smooth or toothless end portion 23 of the saw blade shown in FIG. 16. It will be understood by those skilled in the art that the apertured plates 20 and 22 will slide longitudinally along the flanged members 19 as the sabre saw 4 is moved longitudinally of the table during the cutting operation, the reciprocatory movement of the respective blade being guided by its associated apertured plates 20 or 22.

Another feature of the present invention is the provision of the adjustable guide member 11 on the protractor arm 6. As will be seen in FIGS. 2 and 5, the guide member 11 is formed as an angle iron having one flange 11a abutting a side edge of the protractor arm 6 and the other flange 11b received in a longitudinally extending recess 6a formed in the top surface of the arm. A slot 11c is provided in flange portion 11b for receiving a bolt and wing nut assembly 11e extending through the arm 6. The end of the guide 11 in proximity to the pivotal connection 7 of the protractor arm 6 is cut on a bias as at 11d. By this construction and arrangement, the guide 11 can be adjusted longitudinally of the protractor arm 6 so that the biased end 11d of the guide can extend substantially to the center-line of the saw table slot 14, whereby the workpiece supporting surface of the protractor arm 6 is increased to facilitate cutting relatively thin workpieces. If desired, the guide 11 can be adjusted radially outwardly from the protractor pivotal connection 7 to increase the workpiece supporting surface of the arm 6 in the opposite direction as shown in FIG. 1.

Yet another feature of the saw table of the present invention is the provision of the pressure block assembly 12 for biasing the workpiece 10 against the guide 11 and associated protractor arm 6. As will be seen in FIGS. 1, 2 and 6, the pressure block assembly comprises a housing 12a supported on the top surface of the table, the housing having a vertical through bore 12b for receiving the bolt of a bolt and wing nut assembly 23a extending upwardly through a longitudinally extending slot 24 formed in the saw table 1, whereby the housing can be adjusted longitudinally relative to the table 1 and pivoted about the wing nut assembly 23a as shown in FIGS. 1 and 2. A horizontally extending blind bore 12c is formed in the housing 12 in which a sleeve 12d is fixedly mounted. A bolt 12e is slidably mounted in the sleeve 12d. A block 12f is secured to the outer end of the bolt 12e, and a tension coil spring 12g is mounted concentrically with the bolt and is biased between the block 12f and one end of the sleeve 12d, the bolt head 12h abutting the opposite end of the sleeve 12d. It will thus be seen that the spring biased block 12f will engage an edge of the workpiece 10 urging the opposite edge of the workpiece against the guide 11.

Still another feature of the saw table of the present invention is the use of the scaled blocks 3 at each end of the table for supporting the members 2 above the surface of the table, to thereby provide an elevated track for supporting the cutting tool, and allowing the workpiece to be positioned under the track and supported on the top surface of the table. Referring to FIGS. 1, 2 and 4, each scaled block 3 comprises a transversely extending block 3a secured to the upper surface of the saw table 1. A transversely extending slot 3c is formed in the block 3a which is aligned with a corresponding transversely extending slot 1a formed in the saw table. The bolt of a wing nut assembly 25 extends upwardly through slots 1a and 3c and through the horizontal flange 2a of angle iron 2. As will be seen in FIGS. 1 and 2, each end of the respective angle irons 2 is adjustably connected to a respective block 3a by the wing nut assemblies 25. It will be also noted that each end portion of the vertical flange 2a on each angle iron is cut on a bias as at 2c to accommodate the respective wing nut. A linear dimension scale 3d is provided on the upper surface of each block 3a to facilitate the lateral adjustment of the angle irons 2 for accommodating a selected cutting tool. With the "0" indicia 3e on the scale aligned with the longitudinal axis of the saw table slot 14, to adjust the track, one of the angle irons 2 is set with its inside corner at a distance from the "0" indicia equal to the distance from the center of the saw teeth to the side of the saw base 4a. The other angle iron is then moved laterally and set with its inside corner against the opposite edge of the saw base 4a.

While the saw table of the present invention has been described thus far for use with a sabre saw, the versatility of the table is illustrated in FIGS. 7 and 17 wherein it will be seen that the table is adapted to accommodate other cutting tools such as a router 26, FIG. 7, or a circular saw 27, FIG. 17. As will be seen in FIGS. 7 and 10, when using the router 26, rectangular plate 26a having an aperture 26b through which the router cutter 26c extends is secured to the base 26d of the router by bolts 26e extending through holes 26f provided in the plate 26a in proximity to the peripheral edge of the aperture 26b. The router 26 and associated plate 26a is slidably mounted on the track provided by members 2 by a bolt and wing nut assembly 28 as shown in FIG. 8, the assembly including a washer 28a having an upwardly turned edge portion 28b engaging the bottom surface of the plate 26a to hold the plate 26a slightly above the flange 2a to thereby facilitate the slidable movement of the router on the track. A pair of holes 26g, FIG. 10, is formed in the rectangular plate to accommodate the bolt and wing nut assemblies 28 at opposite diagonal corners of the plate.

Also when setting up the table for use with the router 26, the work support guide 11 used in the set up shown in FIGS. 1 and 2 is replaced by another guide member 29 as shown in FIGS. 7 and 11. Guide member 29 extends transversely of the table and is supported thereon, the guide member having a flanged edge 29a slidably mounted in the recess 6a formed in the protractor arm 6, and a recess 29b is provided in the guide 29 to accommodate the router cutter 26c.

In using the router 26 to cut a workpiece 30, the workpiece can be held stationary between the pressure block 12 and guide 29, and the router can be moved along the track member 2 while cutting the workpiece 30. If it is desired to cut the workpiece by moving the workpiece relative to the router, the wing nut assemblies 28 are tightened to clamp the router to the track allowing the operator to move the workpiece transversely of the table 1 in a direction as indicated by the arrow 31.

When setting the table for use with the circular saw 27 shown in FIG. 17, the track members 2 are set, as described hereinabove, so that the blade is aligned with the longitudinal axis of the table saw slot 14. Since the circular saw blade does not need any additional guiding, as does the sabre saw blade, the guide members 15, FIGS. 3 and 3a, would be adjusted laterally outwardly so that the circular saw blade would project freely through the saw table slot 14. If the table is equipped with the flanged members 19, FIG. 12, no adjustment would be necessary since the circular saw blade would project through the saw table slot 18 and would extend into the space between the members 19.

From the above description, it will be readily appreciated by those skilled in the art that the portable saw table of the present invention can be easily set up to accommodate either a sabre saw, a router or a circular saw. The use of a guide underneath the table provides support for a reciprocating sabre saw blade, to thereby enable the operator to make an accurate cut in the workpiece. The use of a work support guide on the protractor arm and the pressure block provide an increased support for the workpiece while being cut, and the use of the scaled blocks supporting the track members, and the employment of the various bolt and wing nut assemblies facilitate and reduce the time required for setting up the table for use with a selected cutting tool.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

I claim:

1. A saw table comprising, a table, a saw blade slot provided in said table, saw blade guide means mounted beneath said table in alignment with said saw blade slot, said saw blade guide means comprising a pair of spaced, parallel longitudinally extending flanged members connected beneath said table, the space between said longitudinally extending flanged members being aligned with the saw table slot, a plate slidably mounted on said flanged members, said plate being operatively connected to the blade of a cutting tool during the cutting of a workpiece on the table to thereby guide and prevent twisting of the blade during the cutting operation.

2. A saw table according to claim 1, wherein the cutting tool comprises a sabre saw, said plate being apertured for receiving the lower end portion of the sabre saw blade.

3. A saw table according to claim 2, wherein the saw blade is toothless at the free end portion thereof, the toothless portion of said blade extending through an aperture in said plate.

4. A saw table according to claim 3, wherein the saw blade is provided with a bifurcated free end portion, each leg of said bifurcation extending through a respective aperture in said plate.

5. A saw table comprising, a table, a saw blade slot provided in said table, a transversely extending scaled block mounted on each end of said table, a pair of spaced, parallel, longitudinally extending angle irons extending between said scaled blocks and mounted thereon, said angle irons being elevated above said table and said saw blade slot to thereby form a track for supporting a cutting tool with a saw blade for cutting a workpiece disposed beneath the track and supported on the table, a transversely extending slot provided in each block aligned with a corresponding transversely extending slot in the saw table, nut and bolt assemblies extending vertically through said transverse slots and horizontally disposed flanges of each of said angle irons, whereby the space between the longitudinally extending angle irons can be varied by individual selected lateral adjustment of each of said angle irons, a linear dimension scale mounted on the upper surface of each of said blocks to facilitate the lateral adjustment of the angle irons relative to the saw blade slot for accommodating a selected cutting tool, a pair of spaced, parallel, longitudinally extending saw blade guide members mounted beneath said table, the space between said saw blade guide members being aligned with the saw blade slot and being slightly greater than the thickness of the saw blade, and said saw blade guide members cooperating with the saw blade to prevent twisting of the saw blade during the cutting operation.

6. A saw table according to claim 5, wherein the longitudinally extending members are adjustably connected to the bottom surface of the table, whereby the width of the guide space can be varied.

* * * * *